(12) United States Patent
Varnedoe

(10) Patent No.: US 7,591,076 B2
(45) Date of Patent: Sep. 22, 2009

(54) MULTIFUNCTIONAL SQUARING JIG

(76) Inventor: William Frank Varnedoe, 9187 Ravena Rd., Tallahassee, FL (US) 32309

( * ) Notice: Subject to any disclaimer, the term of this patent is extended or adjusted under 35 U.S.C. 154(b) by 150 days.

(21) Appl. No.: 11/906,814

(22) Filed: Oct. 4, 2007

(65) Prior Publication Data

US 2009/0090012 A1 Apr. 9, 2009

(51) Int. Cl.
*B43L 7/027* (2006.01)
(52) U.S. Cl. .......................... 33/481; 33/562
(58) Field of Classification Search ............. 33/474, 33/475, 481, 562; 269/37, 40, 41
See application file for complete search history.

(56) References Cited

U.S. PATENT DOCUMENTS

| 715,946 | A | * | 12/1902 | Bennett | 33/340 |
|---|---|---|---|---|---|
| 1,048,333 | A | * | 12/1912 | Mishler | 33/481 |
| 3,394,389 | A | | 7/1968 | Giora | |
| 4,102,374 | A | * | 7/1978 | Klein | 269/37 |
| 4,300,754 | A | | 11/1981 | Lawrence | |
| 4,749,176 | A | * | 6/1988 | Bradshaw | 269/41 |
| 5,971,379 | A | | 10/1999 | Leon, Jr. | |
| 6,279,885 | B1 | | 8/2001 | Leon, Jr. | |
| 6,327,786 | B1 | * | 12/2001 | Felix | 33/474 |
| 6,808,964 | B2 | | 10/2004 | Hayashi et al. | |
| 6,996,911 | B1 | * | 2/2006 | Dinius | 33/481 |
| 2007/0245582 | A1 | * | 10/2007 | Bittner | 33/474 |

* cited by examiner

*Primary Examiner*—G. Bradley Bennett
(74) *Attorney, Agent, or Firm*—William H. Hollimon

(57) ABSTRACT

A universal squaring jig which may be used when welding various workpieces in perpendicular orientation. The squaring jig has two workpiece holders attached together by one or more support members. Each holder has three mating surfaces. The first and second mating surfaces together form a perpendicular interior corner. The first and third mating surfaces form a perpendicular exterior corner. Magnets are placed on both the first and third mating surfaces to hold workpieces in mating contact with the surfaces of the squaring jig during welding.

18 Claims, 9 Drawing Sheets

MULTIFUNCTIONAL SQUARING JIG

CROSS-REFERENCES TO RELATED APPLICATIONS

Not Applicable

STATEMENT REGARDING FEDERALLY SPONSORED RESEARCH OR DEVELOPMENT

Not Applicable

MICRO APPENDEX

Not Applicable

BACKGROUND OF THE INVENTION

1. Field of the Invention

This invention relates to the field of welding jigs. More specifically, the present invention comprises a multifunctional squaring jig capable of holding various workpieces in perpendicular orientation when welding.

2. Description of the Related Art

Various jigs are available for holding workpieces when welding. FIG. 1 illustrates a squaring jig which may be used to hold two pieces of angle iron in a perpendicularly abutting relationship. Square 10 generally includes holder 12 and holder 14 which are joined by support member 24. Holder 12 has surface 16 and surface 18 which form a perpendicular interior corner. Likewise, holder 14 has surface 20 and surface 22 which form a perpendicular interior corner. When using square 10, a piece of angle iron is placed in each holder such that the corner of the angle iron is situated in the perpendicular interior corner and the angle iron mates with both of the perpendicularly situated mating surfaces. The angle iron may be held in place with clamps or by hand when welding. Further, as described in U.S. Pat. No. 5,971,379 to Leon, magnets may be employed on surfaces 16, 18, 20, and 22 to hold the workpieces in place.

Although squaring jigs such as the ones shown in FIG. 1 and U.S. Pat. No. 5,971,379 to Leon are useful for holding relatively small workpieces together (such as pieces of angle iron), they are not well suited for holding larger pieces together (such as metal sheets. These applications typically require a more customized solution. For example, the welder may use a carpentry square to align the sheets and then clamp the sheets together with clamps. When attaching the clamps, the sheets often come out of alignment. Thus, the setup should be rechecked with the carpentry square to make sure that the components are still in alignment prior to welding. Such a process may require multiple adjustments before the components are finally secured in the desired orientation. It would therefore be desirable to provide a welding jig which can easily align two sheets of material and maintain the sheets in alignment during welding.

In addition, a welder generally has a large collection of jigs for the many different applications the welder expects to encounter. These jigs take up workspace and are prone to misplacement. Searching for a misplaced jig wastes time and can be extremely frustrating. Thus it would be desirable to have a single jig which can be used in many different welding applications.

BRIEF SUMMARY OF THE INVENTION

The present invention comprises a universal squaring jig which may be used when welding various workpieces in perpendicular orientation. The squaring jig has two workpiece holders attached together by one or more support members. Each holder has three mating surfaces. The first and second mating surfaces together form a perpendicular interior corner. The first and third mating surfaces form a perpendicular exterior corner. Magnets are placed on both the first and third mating surfaces to hold workpieces in mating contact with the surfaces of the squaring jig during welding.

The present invention can be used in two distinct aligning configurations. In one configuration, workpieces are attached to the first and second mating surfaces of each holder such that the workpieces abut in a perpendicular orientation. The magnets on the first mating surfaces hold the workpieces in place as the two pieces are being welded together. This configuration is particularly useful when welding pieces of angle iron together. In the second configuration, the workpieces are placed next to the third mating surfaces of the holder. In this configuration, the squaring jig acts as a magnetic brace. The second configuration is particularly useful when welding metal sheets together.

REFERENCE NUMERALS IN THE DRAWINGS

| 10 | square | 12 | holder |
|---|---|---|---|
| 14 | holder | 16 | surface |
| 18 | surface | 20 | surface |
| 22 | surface | 24 | support member |
| 26 | multifunctional squaring jig | 28 | holder |
| 30 | holder | 32 | stop |
| 34 | stop | 36 | surface |
| 38 | surface | 40 | surface |
| 42 | surface | 46 | surface |
| 48 | surface | 50 | supports |
| 52 | magnets | 54 | magnets |
| 56 | plane | 58 | plane |
| 60 | plane | 62 | plane |
| 64 | plane | 66 | workpiece |
| 68 | workpiece | 70 | vacant corner |
| 72 | workpiece | 74 | workpiece |

DETAILED DESCRIPTION OF THE INVENTION

Figure 1:
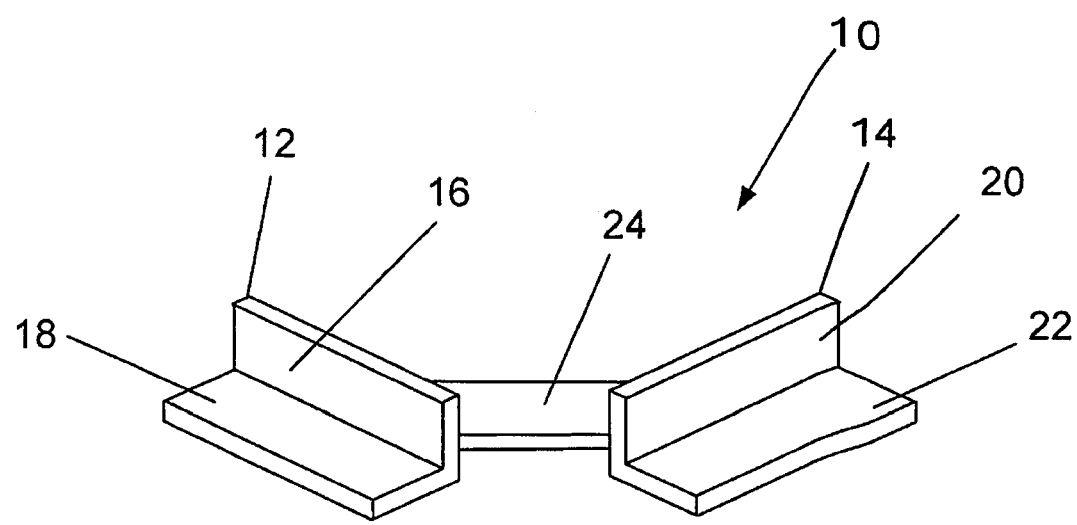
FIG. 1 is a perspective view, showing a prior art squaring jig.
Figure 2:
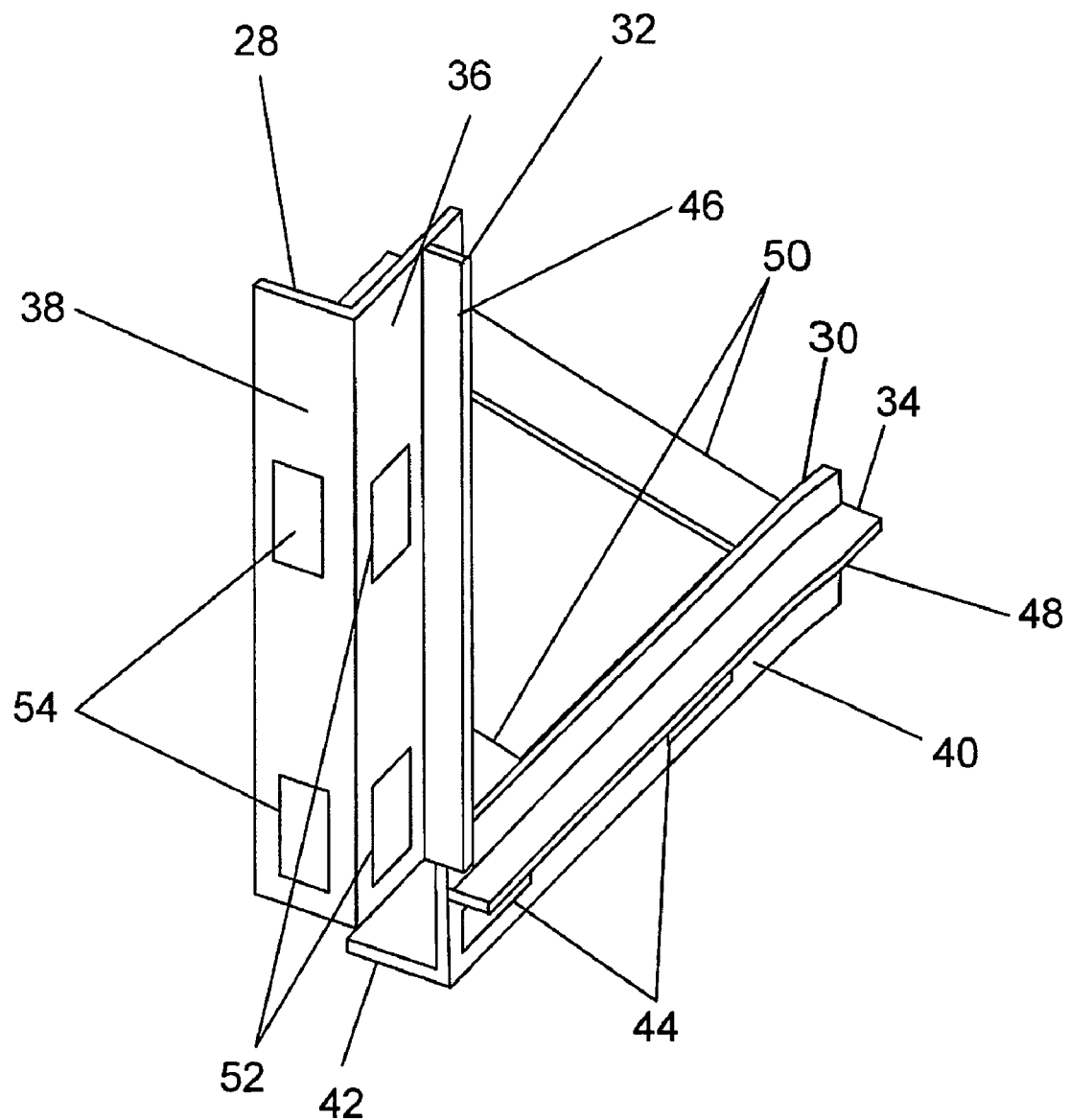
FIG. 2 is a perspective view, showing the present invention.

The present invention, multifunctional squaring jig 26, is illustrated in FIG. 2. Multifunctional squaring jig 26 includes holder 28 and holder 30 which are joined together by two supports 50. Holder 28 has stop 32 with surface 46 which is perpendicular to surface 36. Surface 46 and surface 36 together form an interior corner. Surface 36 includes a pair of magnets 52 which exert an attractive magnetic force on metal objects placed near surface 36. Surface 38 extends away from the edge of surface 36 to form an exterior corner. Like surface 36, surface 38 has a pair of magnets 54 which exert an attractive magnetic force on metal objects placed near surface 38.

Holder 30 is nearly identical to holder 28. Holder 30 has stop 34 with surface 48 which is perpendicular to surface 40. Surface 48 and surface 40 together form an interior corner. Two magnets 44 are attached to surface 40. Surface 42 extends away from the edge of surface 40 to form an exterior corner. Although not shown in this illustration, surface 42 also has a pair of magnets which exert a magnetically attractive force on metal objects placed near surface 42.

Figure 3:
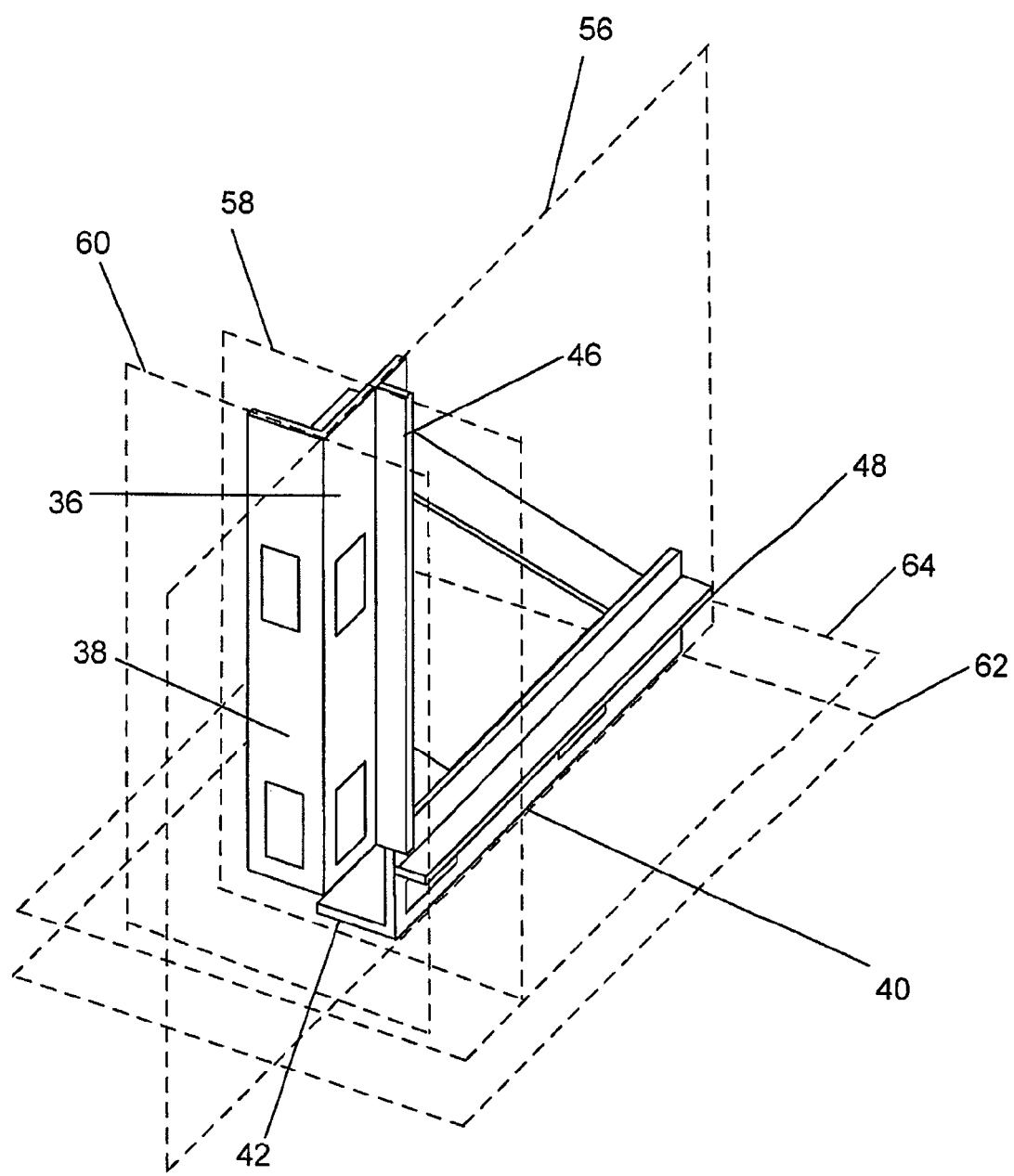
FIG. 3 is a perspective view, showing the present invention.
Figure 4:
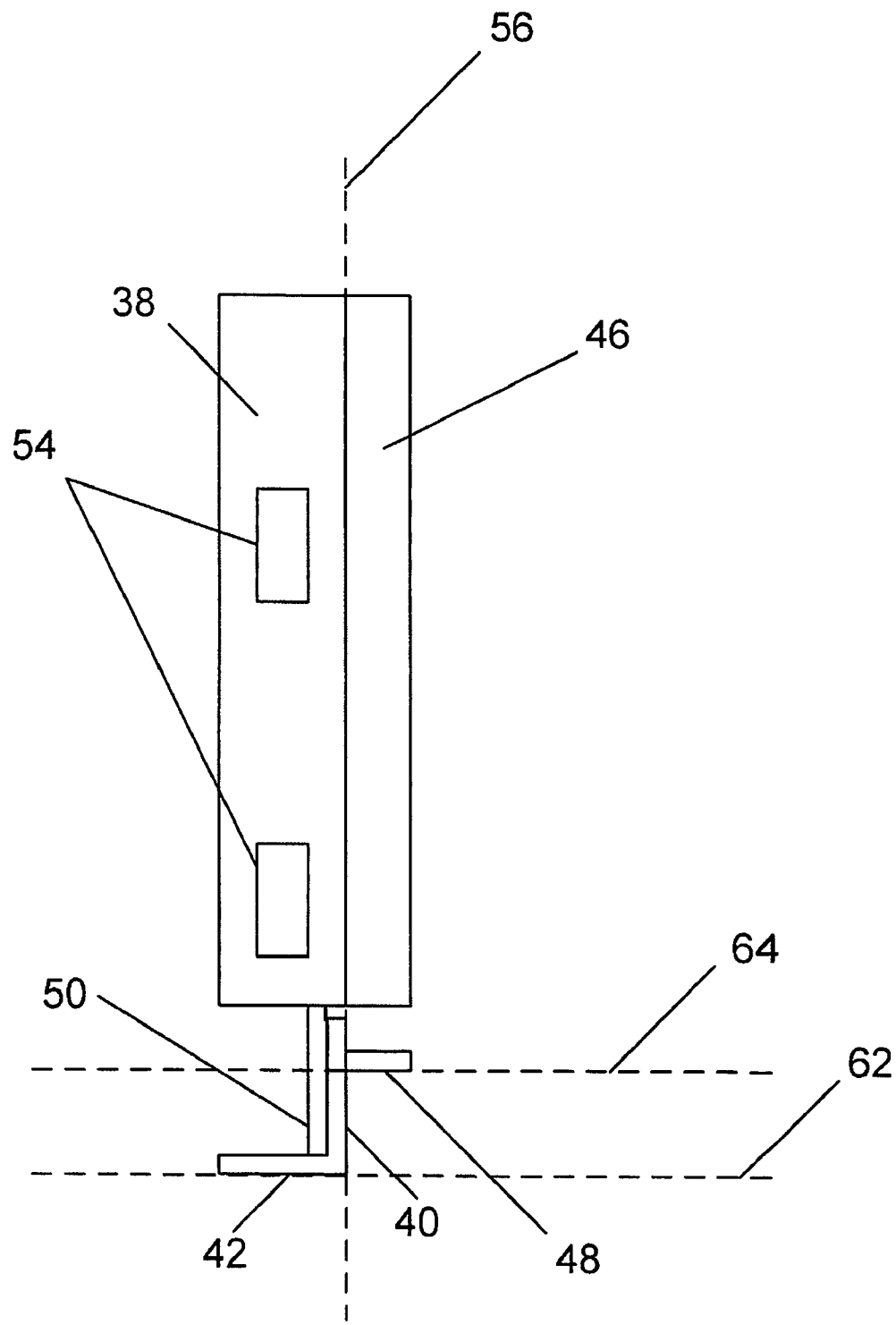
FIG. 4 is a end view, showing the present invention.
Figure 5:
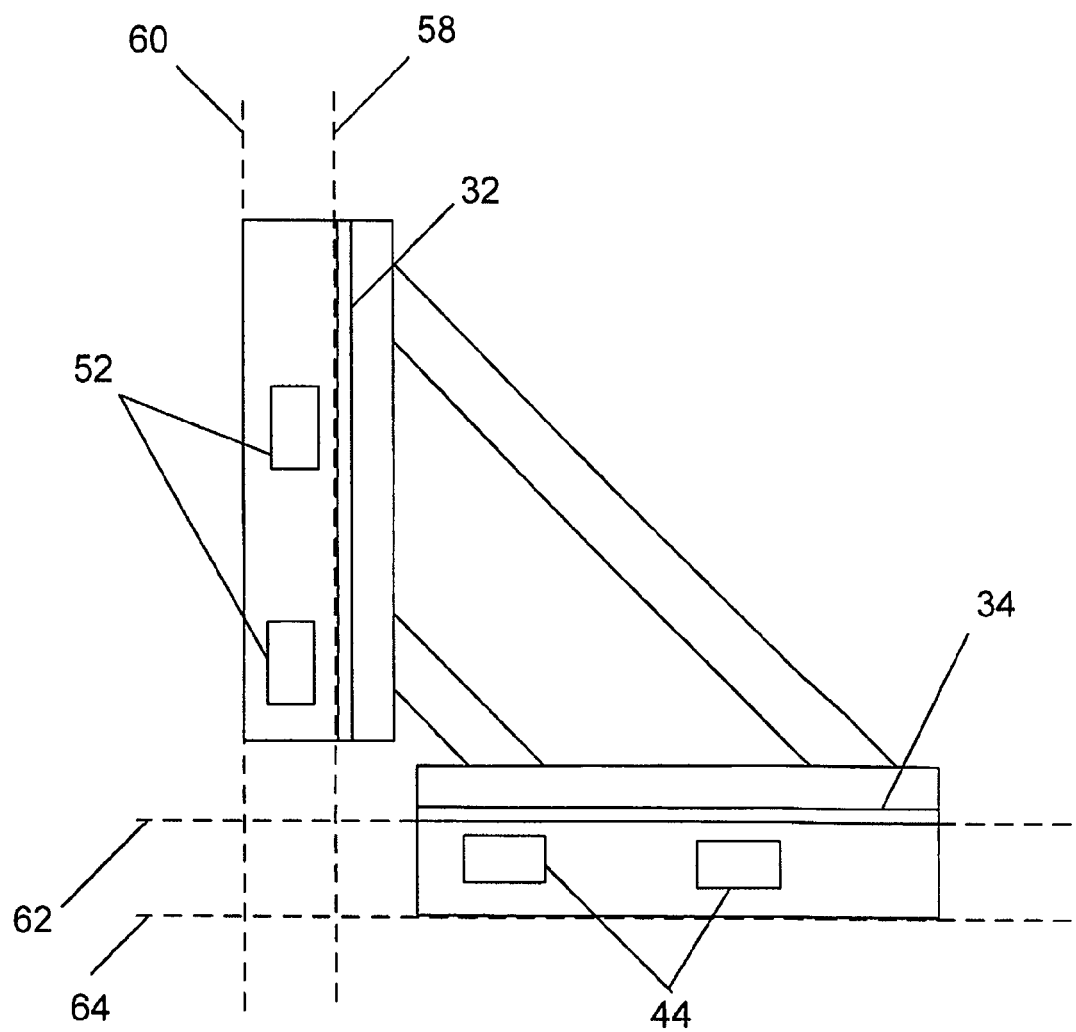
FIG. 5 is a side view, showing the present invention.

FIGS. 3, 4, and 5 illustrate the geometric relationship of the various surfaces of the present invention. Surface 36 and surface 40 are coplanar on plane 56. Surface 46 lies on plane 58 which is perpendicular to plane 56. Surface 38 lies on plane 60 which is parallel to plane 58 and perpendicular to plane 56. Surface 48 lies on plane 64 which is perpendicular to plane 56 and planes 58 and 60. Surface 42 lies on plane 62 which is parallel with plane 64 and perpendicular to plane 56 and planes 58 and 60.

Figure 6:
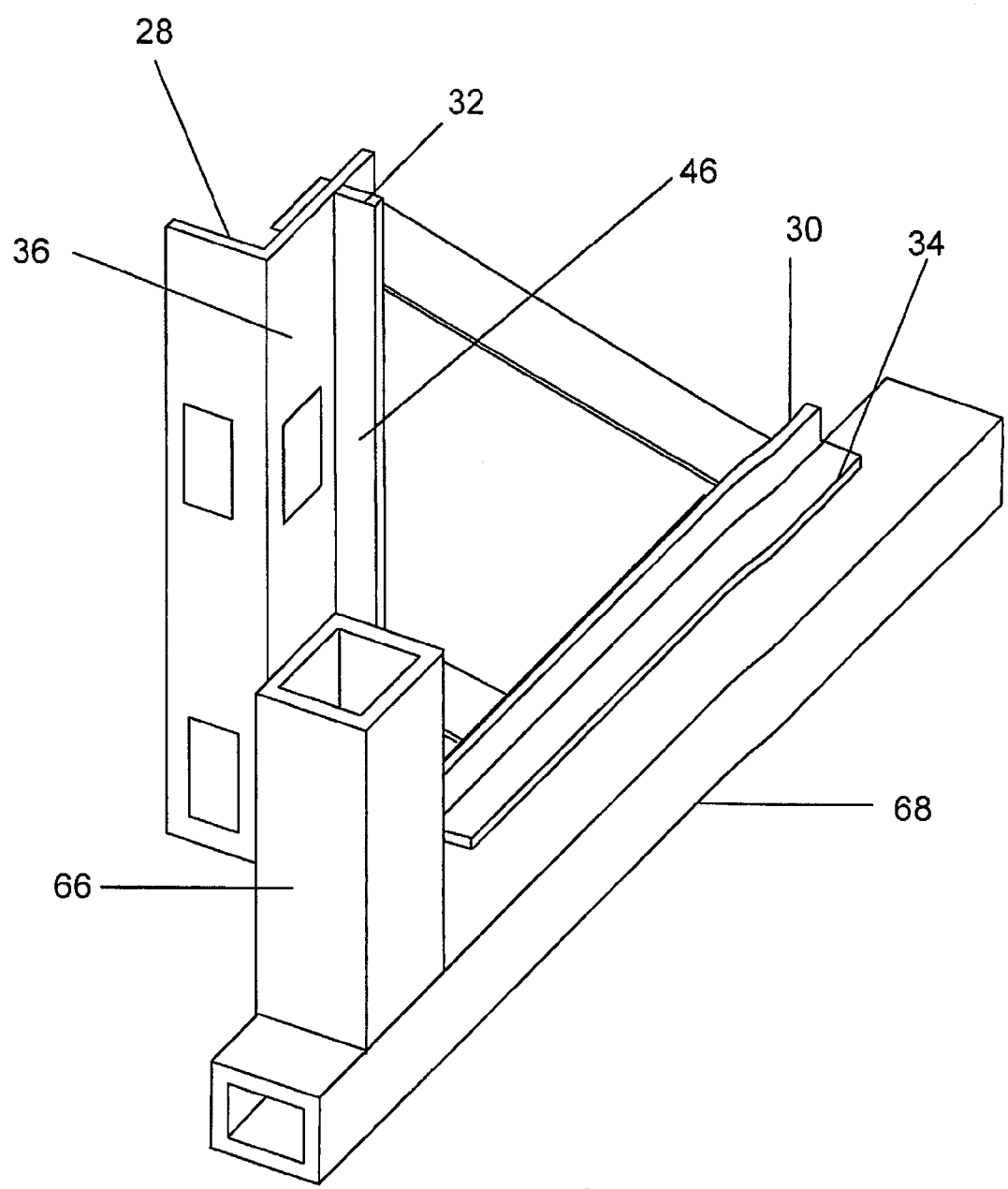
FIG. 6 is a perspective view showing the present invention in use.
Figure 7:
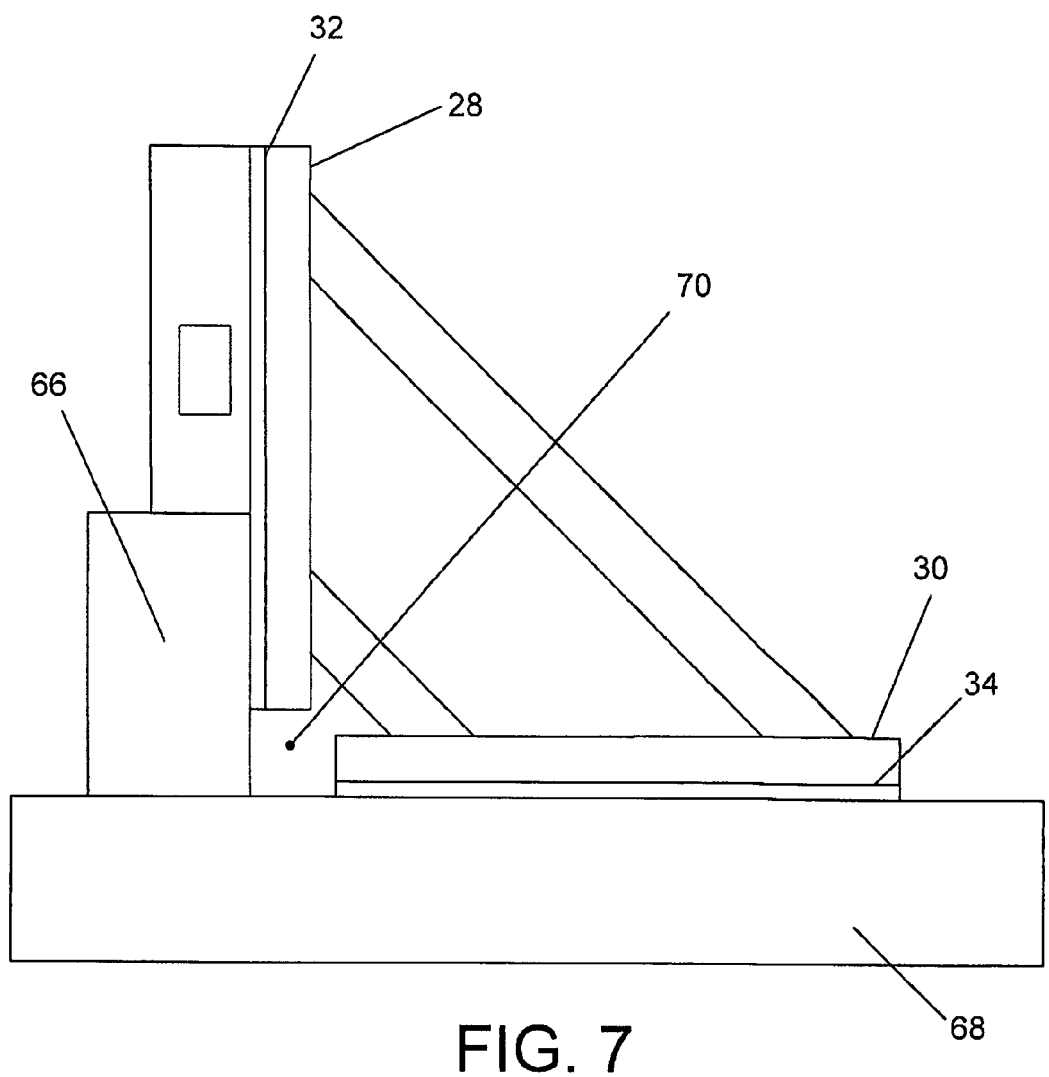
FIG. 7 is a side view, showing the present invention in use.

The present invention can be used in two distinct aligning configurations. FIGS. 6 and 7 illustrate one such aligning configuration. In this embodiment, workpiece 66 and workpiece 68 are held in a perpendicularly abutting relationship by holder 28 and holder 30, respectively. In this embodiment workpiece 66 and workpiece 68 are pieces of square pipe. Workpiece 66 is held in mating contact with surface 46 on stop 32 and surface 34 by the magnet on surface 46. Workpiece 68 is held in mating contact with surface 48 on stop 34 and surface 40 by magnets on surface 40 (surface 40 and surface 48 are hidden by workpiece 68 in the present view). The magnetic force exerted by holders 28 and 30 hold workpieces 66 and 68 in a fixed position while the welder welds the two components together. Turning to FIG. 7, the reader will note that vacant corner 70 provides clearance so that the welder can weld all sides of the joint. The aligning configuration shown in FIGS. 6 and 7 may also be used when joining two pieces of angle iron or other framing members.

Figure 8:
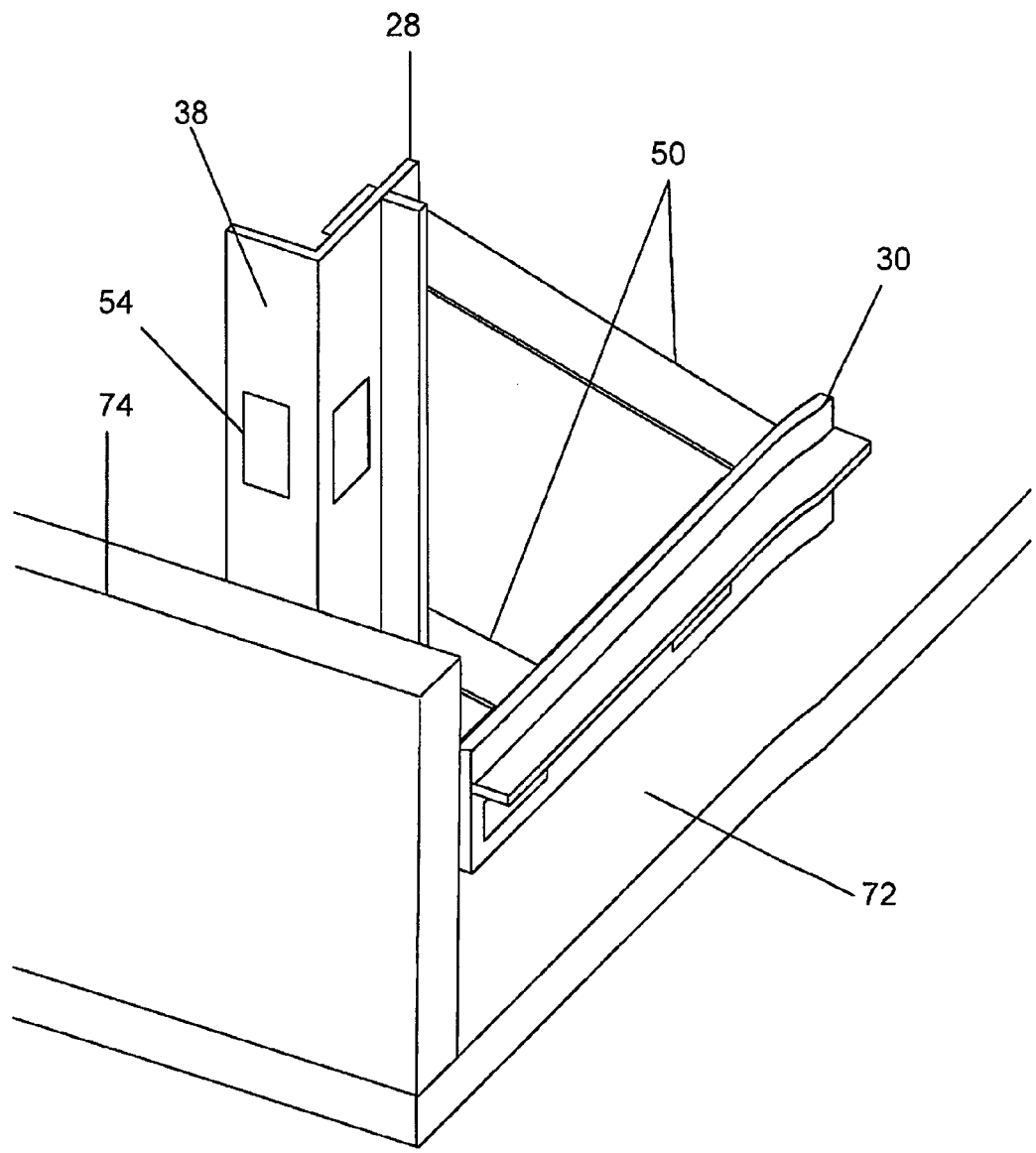
FIG. 8 is a perspective view, showing the present invention in use.
Figure 9:
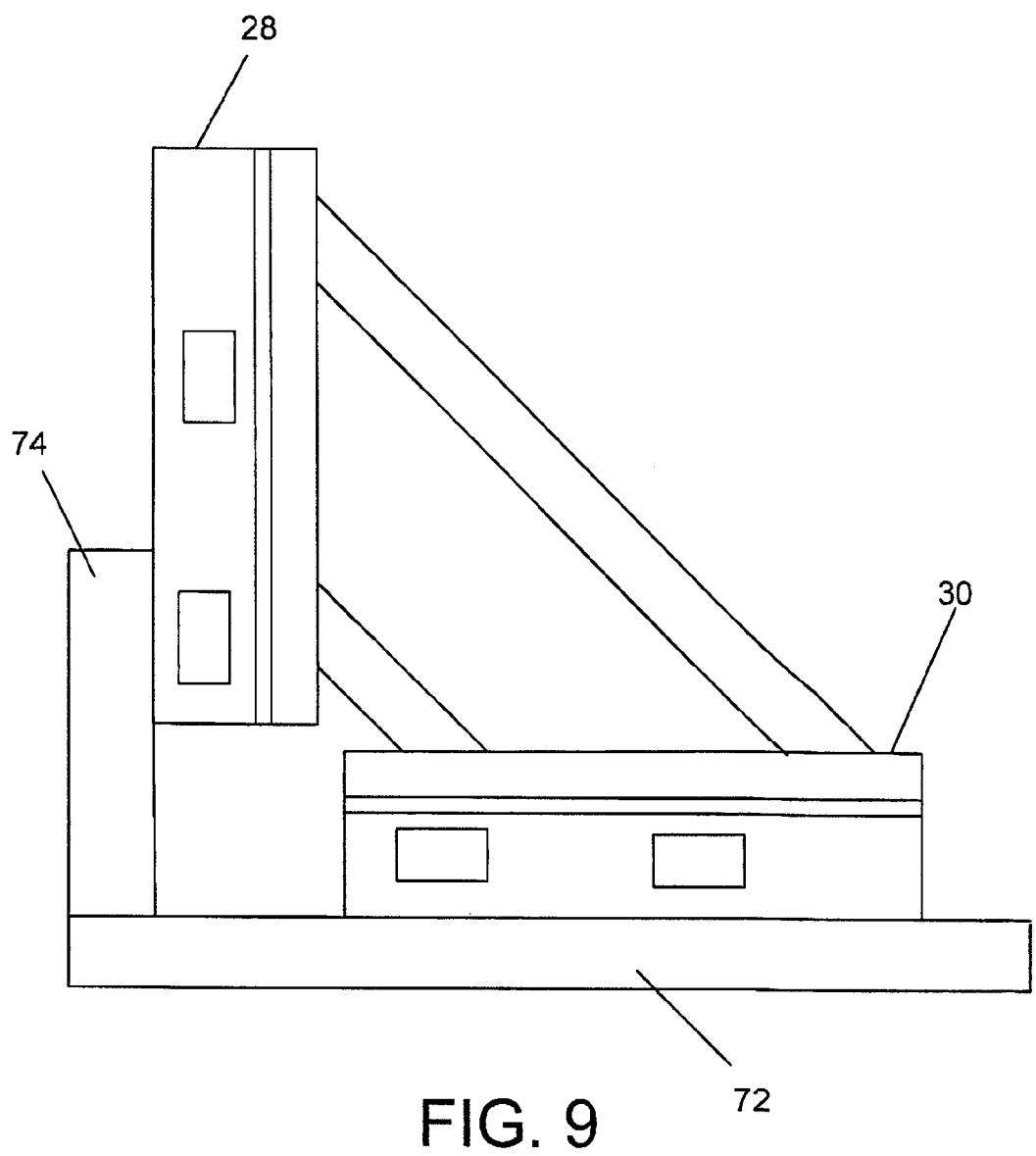
FIG. 9 is a side view, showing the present invention in use.

FIGS. 8 and 9 illustrate the present invention in a second aligning configuration. In this configuration, the present invention acts as a brace supporting the weight of workpiece 74, and holding workpieces 74 and 72 in a perpendicular relationship. In the present illustration, workpiece 74 and workpiece 72 are sheets of metal. Magnets 54 on surface 38 hold workpiece 74 against surface 38. Surface 42 (not visible in the present illustration) mates with the top surface of workpiece 72. Magnets on surface 42 hold the present invention in place on the top surface of workpiece 72. Supports 50 act as cross-braces, allowing the present invention to support the weight of metal plates many times taller than the squaring jig.

The preceding description contains significant detail regarding the novel aspects of the present invention. It is should not be construed, however, as limiting the scope of the invention but rather as providing illustrations of the preferred embodiments of the invention. As an example, magnets 52, 54, and 44 are portrayed as being embedded in the surfaces of the holders. These magnets may also be attached to the holders on the back side of the surfaces (i.e., the surfaces facing away from the workpieces). The magnets would still provide the necessary attractive force in such a configuration. Also, although the illustrated embodiment is adapted for welding pieces in perpendicular orientation, the device may also be designed for welding objects together at other angles (such as 45 degrees or 60 degrees). Thus, the scope of the invention should be fixed by the following claims, rather than by the examples given.

The invention claimed is:

1. A multifunctional squaring jig for holding a first workpiece and a second workpiece in abutment, comprising:
   a. a first holder having a first mating surface, a second mating surface, and a third mating surface, said first mating surface and said second mating surface foiling a first interior corner;
   b. a second holder attached to said first holder, said second holder having a fourth mating surface, a fifth mating surface, and a sixth mating surface, said fourth mating surface and said fifth mating surface forming a second interior corner;
   c. wherein said first mating surface and said fourth mating surface are coplanar on a main plane, said second mating surface is situated on a first vertical plane perpendicular to said main plane, said third mating surface is situated on a second vertical plane perpendicular to said main plane and parallel to said first vertical plain, said fifth mating surface is situated on a first horizontal plane perpendicular to both said main plane and said first vertical plane, and said sixth mating surface is situated on a second horizontal plane perpendicular to both said main plane and said first horizontal plane and parallel to said first horizontal plane;
   d. wherein said squaring jig is configured to hold and maintain said first workpiece and said second workpiece in a perpendicularly-abutted orientation in both a first aligning configuration and a second aligning configuration; wherein in said first aligning configuration, said first workpiece mates with said first mating surface and said second mating surface and said second workpiece mates with said fourth mating surface and said fifth mating surface; and wherein in said second aligning configuration, said first workpiece mates with said third mating surface and said second workpiece mates with said sixth mating surface.

2. The multifunctional squaring jig of claim 1, wherein said first mating surface and said third mating surface together form a first exterior corner and said fourth mating surface and said sixth mating surface together form a second exterior corner.

3. The multifunctional squaring jig of claim 1, wherein said first mating surface extends between said second mating surface and said third mating surface and said fourth mating surface extends between said fifth mating surface and said sixth mating surface.

4. The multifunctional squaring jig of claim 2, wherein said first mating surface extends between said second mating surface and said third mating surface and said fourth mating surface extends between said fifth mating surface and said sixth mating surface.

5. The multifunctional squaring jig of claim 1, further comprising a first-magnet attached to said first holder, said first magnet configured to exert an attractive force such that said first workpiece in held in mating contact with said third mating surface.

6. The multifunctional squaring jig of claim 1, further comprising a first magnet attached to said third mating surface and a second magnet attached to said sixth mating surface.

7. The multifunctional squaring jig of claim 1, wherein said holder is configured to exert a magnetically attractive force on said first workpiece when said first workpiece is placed against said third mating surface.

8. The multifunctional squaring jig of claim 1, said third mating surface having a first edge and a second edge, said first edge adjacent to said first mating surface and said second edge extending outward away from said first mating surface.

9. The multifunctional squaring jig of claim 8, further comprising a first magnet attached to said third mating surface between said first edge and said second edge.

10. The multifunctional squaring jig of claim 8, said sixth mating surface having a third edge and a fourth edge, said third edge adjacent to said fourth mating surface and fourth second edge extending outward away from said fourth mating surface.

11. The multifunctional squaring jig of claim 9, further comprising a second magnet attached to said first mating surface between said first edge of said third mating surface and said first interior corner.

12. A multifunctional squaring jig for holding a first workpiece and a second workpiece in abutment, comprising:
   a. a first holder having a first mating surface, a second mating surface, and a third mating surface, said first mating surface and said second mating surface forming a first interior corner, said first mating surface and said third mating surface forming a first exterior corner, said third mating surface having a first edge extending away from said first mating surface;
   b. a second holder attached to said first holder, said second holder having a fourth mating surface, a fifth mating surface, and a sixth eating surface, said fourth mating surface and said fifth mating surface forming a second interior corner, said fourth mating surface and said sixth mating surface forming a second exterior corner, said sixth mating surface having a first edge extending away from said fourth mating surface;
   c. wherein said first mating surface and said fourth mating surface are coplanar on a main plane, said second mating surface is situated on a first vertical plane perpendicular to said main plane, said third mating surface is situated on a second vertical plane perpendicular to said main plane and parallel to said first vertical plain, said fifth mating surface is situated on a first angular plane perpendicular to said main plane, and said sixth mating surface is situated on a second angular plane perpendicular to said main plane and parallel to said first horizontal plane;
   d. wherein said squaring jig is configured to hold and maintain said first workpiece and said second workpiece in an angularly-abutted orientation in both a first aligning configuration and a second aligning configuration; wherein in said first aligning configuration, said first workpiece mates with said first mating surface and said second mating surface and said second workpiece mates with said fourth mating surface and said fifth mating surface; and wherein in said second aligning configuration, said first workpiece mates with said third mating surface and said second workpiece mates with said sixth mating surface.

13. The multifunctional squaring jig of claim 12, wherein said first mating surface extends between said second mating surface and said third mating surface and said fourth mating surface extends between said fifth mating surface and said sixth mating surface.

14. The multifunctional squaring jig of claim 12, further comprising a first magnet attached to said first holder, said first magnet configured to exert an attractive force such that said first workpiece in held in mating contact with said third mating surface.

15. The multifunctional squaring jig of claim 12, further comprising a first magnet attached to said third mating surface and a second magnet attached to said sixth mating surface.

16. The multifunctional squaring jig of claim 12, wherein said holder is configured to exert a magnetically attractive force on said first workpiece when said first workpiece is placed against said third mating surface.

17. The multifunctional squaring jig of claim 12, said third mating surface having a second edge, said second edge adjacent to said first mating surface.

18. The multifunctional squaring jig of claim 17, further comprising a first magnet attached to said third mating surface between said first edge and said second edge.

* * * * *